(No Model.)
H. GUTHRIE.
DRIVE CHAIN GEAR.
No. 495,584. Patented Apr. 18, 1893.
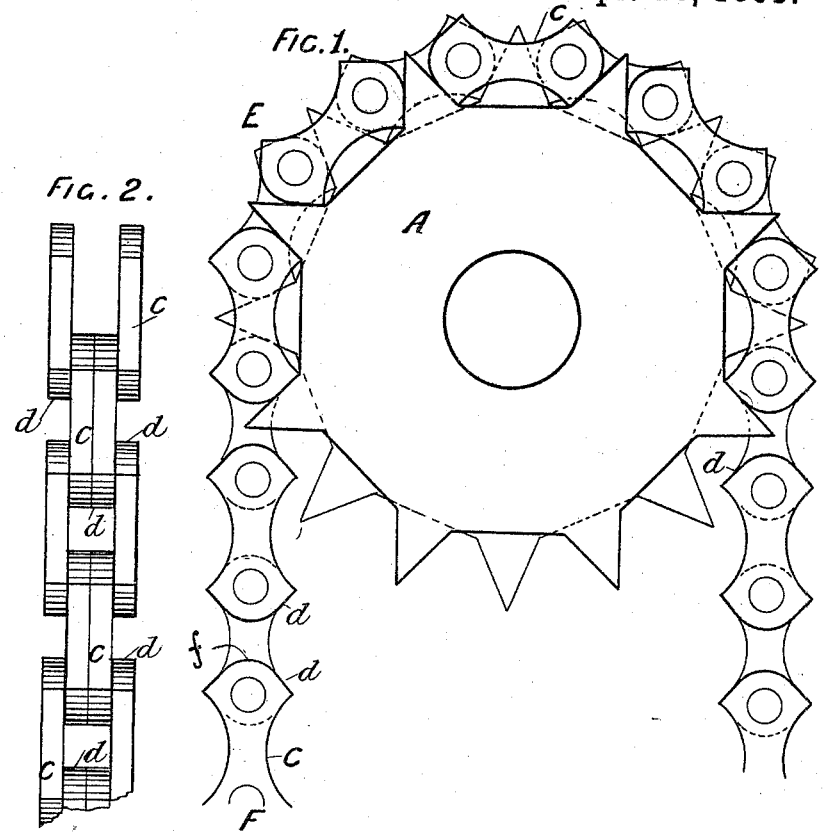
Witnesses.
Inventor:
Herbert Guthrie
By Richard
his Attorneys.

UNITED STATES PATENT OFFICE.

HERBERT GUTHRIE, OF LEVENSHULME, ENGLAND.

DRIVE-CHAIN GEAR.

SPECIFICATION forming part of Letters Patent No. 495,584, dated April 18, 1893.

Application filed August 21, 1891. Serial No. 403,319. (No model.) Patented in England March 9, 1891, No. 4,160.

*To all whom it may concern:*

Be it known that I, HERBERT GUTHRIE, a subject of the Queen of Great Britain, and a resident of Levenshulme, near Manchester, in the county of Lancaster, England, have invented certain new and useful Improvements in Driving-Chains, (for which I have obtained Letters Patent in Great Britain, No. 4,160, bearing date March 9, 1891;) of which the following is a specification.

This invention mainly consists of improvements in that kind of chain gearing known as driving chain gear, the chief object of my improvements being to obtain increased driving and wearing surface without increasing the diameter of the chain wheels or materially increasing the weights of the parts. Preferably I would employ what are known as link chains in contradistinction to what are known as block chains; that is to say, I prefer each part between pin and pin to drive cogs or teeth, or to be driven by cogs or teeth. Nevertheless the principles involved in my invention are partly, but not so perfectly applicable to block chains or chains where the block links only touch the teeth and the links joining the blocks together do not touch the driving or driven surface, but serve only to connect the blocks together.

Hitherto driving chains have been made with the driving head of a cylindrical form concentric with the pin or thereabout so that the actual driving surface has not been more than a line along the cylinder until that cylindrical part got worn flat.

The first point in my invention is to make the ends of the links with a large flat surface, and further, that such surface should be at such an angle with the pitch or center line of the chain as may render a standard form of link suitable for wheels with any number of teeth; that is to say, my links have a very small cylindrical portion concentric with the pin or nearly so on the center of the head on either side of the pitch line and the flat surface forms a tangent to that cylindrical part so that the driving surface is always on the one side only of the pitch line. The angle of this tangential surface with the pitch line will vary somewhat according to the smallest number or teeth which may be decided upon as the minimum sized wheel it may be admissible to adopt. Thus should an eight toothed wheel be decided upon as the minimum then the angle of the tangential surface with the pitch line would be approximately forty-five degrees, whereas should a six tooth wheel be decided as the minimum the angle of the tangential surface with the pitch line would be approximately thirty degrees. The teeth of all larger wheels are made at the same angle with the pitch line so that the driving or driven surface of the teeth will present a bed sufficient to form an area of contact over the whole tangential surface of the link.

Referring to the accompanying drawings, Figure 1 is an elevation of my improved chain on a wheel. Fig. 2 is an edge view of a section of the chain.

In the drawings, A indicates a chain or sprocket wheel.

C, indicates the chain, preferably although not necessarily, of oblong plate form with a transverse rivet or pivot hole at each end. In forming the chain the links are placed longitudinally together with their ends overlapping and the pivots are passed through the holes in the overlapping ends thereby uniting the links. Any desired number of links can be placed together to form the chain. The ends of the links are enlarged to form heads preferably having the rounded concentric portions *f* at the centers of their extremities terminating in the flat tangential bearing surfaces *d, d,* as before described, formed at such an angle to the pitch line E, F, as to insure the said bearing surfaces slipping up the inclined teeth of the wheel when pulling strain is exerted, the bearing surfaces of the wheel teeth being preferably of the same angle as that of said tangential bearing surfaces of the links. This chain is particularly adapted for use in velocipedes, dredges, bucket elevators, and lumber benches, &c.

Having now particularly described and ascertained the nature of my said invention and in what manner the same is to be performed, I declare that what I claim, and desire to secure by Letters Patent of the United States, is—

The drive chain having the flat plate links provided with enlarged heads, the ends $f$ and the flat inclined opposite bearing faces $d\ d$, the latter tangential to and forming continuations of the ends $f$ in combination with the chain wheel A having the straight sided angular teeth, all substantially as described.

In witness whereof I have hereunto set my hand in presence of two witnesses.

HERBERT GUTHRIE.

Witnesses:
H. B. BARLOW,
S. W. GILLETT.